United States Patent [19]
Girard

[11] Patent Number: 6,147,839
[45] Date of Patent: *Nov. 14, 2000

[54] HEAD SUSPENSION WITH OUTRIGGERS EXTENDING ACROSS A SPRING REGION

[75] Inventor: Mark T. Girard, Hutchinson, Minn.

[73] Assignee: Hutchinson Technology, Inc., Hutchinson, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/771,936

[22] Filed: Dec. 23, 1996

[51] Int. Cl.⁷ .................................................. G11B 5/48
[52] U.S. Cl. ............................................ 360/244.8
[58] Field of Search ........................... 360/104, 105, 360/106, 244.2, 244.8

[56] References Cited

U.S. PATENT DOCUMENTS

| | | | |
|---|---|---|---|
| 4,543,295 | 9/1985 | St. Clair et al. | 428/458 |
| 4,616,279 | 10/1986 | Poorman | 360/103 |
| 4,670,084 | 6/1987 | Kant et al. | 360/109 |
| 4,789,914 | 12/1988 | Ainslie et al. | 360/103 |
| 4,797,763 | 1/1989 | Levy et al. | 360/104 |
| 4,819,094 | 4/1989 | Oberg | 360/104 |
| 4,996,623 | 2/1991 | Erpelding et al. | 360/104 |
| 5,001,583 | 3/1991 | Matsuzaki | 360/104 |
| 5,103,359 | 4/1992 | Marazzo | 360/104 |
| 5,111,351 | 5/1992 | Hamilton | 360/104 |
| 5,126,904 | 6/1992 | Sakurai | 360/106 |
| 5,163,218 | 11/1992 | Hamilton | 29/603 |
| 5,198,945 | 3/1993 | Blaeser et al. | 360/104 |
| 5,274,911 | 1/1994 | Toro | 29/827 |
| 5,282,103 | 1/1994 | Hatch et al. | 360/104 |
| 5,331,489 | 7/1994 | Johnson et al. | 360/104 |
| 5,353,181 | 10/1994 | Frater et al. | 360/103 |
| 5,391,842 | 2/1995 | Bennin et al. | 174/260 |
| 5,422,764 | 6/1995 | McIlvanie | 360/97.01 |

(List continued on next page.)

FOREIGN PATENT DOCUMENTS

| | | |
|---|---|---|
| 0 599 669 A2 | 6/1994 | European Pat. Off. . |
| 0 764 942 A1 | 3/1997 | European Pat. Off. . |
| 0 834 865A1 | 4/1998 | European Pat. Off. . |
| 53-19015 | 2/1978 | Japan . |
| 53-30310 | 3/1978 | Japan . |
| 53-74414 | 7/1978 | Japan . |
| 60-246015 | 12/1985 | Japan . |
| 62-262216 | 11/1987 | Japan . |
| 63-229608 | 9/1988 | Japan . |
| 1-78313 | 5/1989 | Japan . |

(List continued on next page.)

OTHER PUBLICATIONS

Schudel, "Wireless Suspensions" presentation materials, KR Precision Public Company, Limited, Mar., 1997, 20 pages (including "KRP's FAST" materials).

Takada, "Wireless Suspension (CAPS)" literature of Fujitsu Limited, 13 pages.

Schulz et al., "Emerging Flex Market," Printed Circuit Fabrication, Jan. 1998, pp. 34–35.

Ohwe et al., "Development of Integrated Suspension System for a Nanoslider with an MR Head Transducer," IEEE Transactions on Magnetics, vol. 29, No. 6, Nov. 1993, pp. 3925–3926.

*Primary Examiner*—David Davis
*Attorney, Agent, or Firm*—Faegre & Benson LLP

[57] ABSTRACT

A head suspension for supporting a read/write head adjacent a rotating data storage device is constructed with outriggers that enhance its lateral stiffness. The outriggers are formed integrally with the head suspension load region and support region and are laterally spaced on opposite sides of the spring region. By passing over the spring region in connecting the opposite lateral sides of the load region to the support region of the head suspension, the outriggers increase the lateral stiffness and sway frequency of the head suspension without appreciably affecting the spring rate or appreciably increasing the weight of the head suspension.

25 Claims, 9 Drawing Sheets

U.S. PATENT DOCUMENTS

| | | |
|---|---|---|
| 5,446,611 | 8/1995 | Webber ................................. 360/104 |
| 5,452,158 | 9/1995 | Harrison et al. ..................... 360/104 |
| 5,454,158 | 10/1995 | Fontana, Jr. et al. ................... 29/603 |
| 5,461,525 | 10/1995 | Christianson et al. ............... 360/104 |
| 5,463,513 | 10/1995 | Hoshino ............................... 360/104 |
| 5,490,027 | 2/1996 | Hamilton et al. .................... 360/104 |
| 5,491,597 | 2/1996 | Bennin et al. ....................... 360/104 |
| 5,530,605 | 6/1996 | Hamaguchi et al. ................. 360/104 |
| 5,537,274 | 7/1996 | Imasaki ............................... 360/104 |
| 5,572,387 | 11/1996 | Brooks, Jr. et al. .................. 360/104 |
| 5,594,607 | 1/1997 | Erpelding et al. ................... 360/104 |
| 5,597,496 | 1/1997 | Masaichi et al. ...................... 216/94 |
| 5,598,307 | 1/1997 | Bennin ................................. 360/104 |
| 5,606,477 | 2/1997 | Erpelding et al. ................... 360/104 |
| 5,608,591 | 3/1997 | Klaassen ............................. 360/104 |
| 5,617,274 | 4/1997 | Ruiz ..................................... 360/104 |
| 5,630,948 | 5/1997 | Ueda ..................................... 216/20 |
| 5,631,786 | 5/1997 | Erpelding ......................... 360/97.01 |
| 5,645,735 | 7/1997 | Bennin et al. ......................... 216/22 |
| 5,659,448 | 8/1997 | Shimizu et al. ..................... 360/104 |
| 5,661,896 | 9/1997 | Erpelding ......................... 29/603.01 |
| 5,666,717 | 9/1997 | Matsumoto et al. .............. 29/603.12 |
| 5,673,484 | 10/1997 | Masaichi et al. ................. 29/896.93 |
| 5,680,275 | 10/1997 | Frater et al. ....................... 360/104 |
| 5,682,279 | 10/1997 | Imasaki ............................... 360/104 |
| 5,687,479 | 11/1997 | Bennin et al. ......................... 29/885 |
| 5,694,270 | 12/1997 | Sone et al. .......................... 360/104 |
| 5,699,212 | 12/1997 | Erpelding et al. ................... 360/104 |
| 5,701,218 | 12/1997 | Boutaghou ......................... 360/104 |
| 5,710,680 | 1/1998 | Bucska et al. ....................... 360/103 |
| 5,712,748 | 1/1998 | Masse ................................. 360/104 |
| 5,719,726 | 2/1998 | Hayakawa ........................... 360/104 |
| 5,734,524 | 3/1998 | Ruiz ..................................... 360/104 |
| 5,739,982 | 4/1998 | Arya et al. .......................... 360/104 |
| 5,742,454 | 4/1998 | Vera et al. .......................... 360/105 |
| 5,742,998 | 4/1998 | Jones, Jr. .......................... 29/603.14 |
| 5,754,368 | 5/1998 | Shiraishi et al. .................... 360/104 |
| 5,757,585 | 5/1998 | Aoyagi et al. ...................... 360/104 |
| 5,781,379 | 7/1998 | Erpelding et al. ................... 360/104 |
| 5,796,552 | 8/1998 | Akin, Jr. et al. .................... 360/104 |
| 5,796,556 | 8/1998 | Boutaghou ......................... 360/104 |
| 5,805,381 | 9/1998 | Resh ................................... 360/104 |
| 5,835,306 | 11/1998 | Bennin ................................. 360/104 |
| 5,839,193 | 11/1998 | Bennin et al. ....................... 29/896.9 |

FOREIGN PATENT DOCUMENTS

| | | |
|---|---|---|
| 3-71477 | 3/1991 | Japan . |
| 4-40680 | 2/1992 | Japan . |
| 4-146516 | 5/1992 | Japan . |
| 4-219618 | 8/1992 | Japan . |
| 5-36048 | 2/1993 | Japan . |
| 5-303730 | 11/1993 | Japan . |
| 8-147645 | 6/1996 | Japan . |
| 8-249850 | 9/1996 | Japan . |
| 9-16932 | 1/1997 | Japan . |
| 9-35223 | 2/1997 | Japan . |
| 9-147510 | 6/1997 | Japan . |
| 9-282626 | 10/1997 | Japan . |
| 10-21663 | 1/1998 | Japan . |
| 10-55641 | 2/1998 | Japan . |
| 2 292 826 | 3/1996 | United Kingdom . |
| 2 295 918 | 6/1996 | United Kingdom . |
| 2 312 082 | 10/1997 | United Kingdom . |
| WO 93/15593 | 8/1993 | WIPO . |
| WO 95/13609 | 5/1995 | WIPO . |
| WO 96/37883 | 11/1996 | WIPO . |
| WO 96/42080 | 12/1996 | WIPO . |
| WO 97/35302 | 9/1997 | WIPO . |
| WO 97/35303 | 9/1997 | WIPO . |
| WO 97/36290 | 10/1997 | WIPO . |

HEAD SUSPENSION WITH OUTRIGGERS EXTENDING ACROSS A SPRING REGION

BACKGROUND OF THE INVENTION (1) Field of the Invention

The present invention pertains to a head suspension for supporting a read/write head adjacent a rotating data storage device, and in particular to a head suspension that is constructed with outriggers that enhance its lateral stiffness.

(2) Description of the Related Art

Most personal computer systems today employ direct access storage devices (DASD) or rigid disk drives for data storage. A conventional disk drive contains a spindle that is rotated by an electric motor at several thousand revolutions of the spindle per minute while the disk drive is turned on. One or more magnetically coated recording disks are mounted on the spindle for rotation therewith at axially spaced positions along the spindle.

Positioned adjacent the peripheries of the rotating disk is a head actuator column. The head actuator column typically has a plurality of actuator arms thereon, and each actuator arm supports one or more head suspensions that extend in cantilever fashion from the actuator arm to distal ends of the head suspension. The head suspensions are very precise metal springs that hold magnetic transducer read/write heads at microscopic distances above the rotating disks in the disk drive. They are typically comprised of a proximal support region that attaches the suspension to an actuator arm, a distal load region that supports the read/write head, and an intermediate spring region that biases the load region and the read/write head toward the rotating disk. The read/write heads are attached to sliders at the distal ends of each of the head suspensions. The plurality of actuator arms and their associated head suspensions support the read/write heads adjacent the top and bottom surfaces of each of the plurality of disks supported by the spindle. The read/write heads do not contact the surface of the rotating disk, but instead "fly" on the slider at a precisely maintained microscopic distance above the rotating disk surface. If this flying distance or height becomes too excessive, it can impair the ability of the read/write head to read or write data. If the flying height becomes too small causing the slider to contact the surface of the rotating disk, the resulting contact between the slider and the rotating disk can damage the surface of the disk destroying the data stored on the disk as well as potentially destroying the read/write head itself.

It is a complicated problem to design a head suspension that can cantilever a read/write head from an actuator arm at a substantially constant position relative to the surface of a rotating disk while maintaining an extremely small clearance between the head and the rotating disk surface, with the clearance sometimes being only 3 microinches. The head suspension maintains the read/write head at a correct flying distance from the surface of the rotating disk because of an equilibrium created between the upward force of the air driven under the slider by the rotation of the disk and the downward spring bias force applied by the head suspension. The suspension must also hold the head at a correct pitch angle and a correct roll angle simultaneously relative to the rotating surface of the disk. To accomplish this, the head suspension must be sufficiently flexible in the pitch and roll directions. The surface of a data storage disk is not perfectly flat. When rotating in the disk drive, the contours of the disk surface create disruptions in the air stream or air bearing created above the rotating disk surface on which the transducer head slider glides or flies. As slider sizes decrease in size, the supporting air bearing also decreases in size, decreasing the lift force exerted on the transducer head slider. Therefore, as sliders have decreased in size, the pitch and roll stiffness of suspensions has also decreased.

Head suspensions must also have a high lateral (transverse) stiffness to prevent unintended motion or sway of the suspension and its attached read/write head due to the acceleration and deceleration forces exerted on the suspension while it rapidly moves to position the read/write head at different radial locations on the disk. Even though sliders are becoming increasingly smaller and their mass is becoming smaller, the increased acceleration and deceleration forces cannot be ignored. Therefore, as head suspensions having a low pitch and roll stiffness for smaller sliders are developed, steps must be taken to avoid reducing the lateral stiffness of the head suspension while also avoided affecting the spring rate or spring bias of the head suspension spring region.

SUMMARY OF THE INVENTION

The present invention is directed to a head suspension that cantilevers a magnetic transducer read/write head adjacent the rotating surface of a disk in a disk drive from an actuator arm of the disk drive, where the head suspension has a unique construction that enhances its lateral stiffness. The head suspension is disclosed in several embodiments, all of which include a pair of outriggers. The outriggers connect the distal load region of the head suspension that supports the slider and transducer head with the proximal support region of the head suspension attached to a disk drive actuator arm, bypassing the intermediate spring region of the head suspension. The outriggers enhance the lateral stiffness of the head suspension without appreciably affecting the spring rate of the head suspension spring region. The outriggers are described as being employed on head suspensions comprising load beams and flexures, but may also be employed in other types of head suspensions such as those comprising load beams with integral gimbals formed at their distal ends. The outriggers could be part of any load beam, and a head suspension employing the outriggers could have either a separate flexure or an integral flexure.

In one embodiment of the invention, the outriggers are employed on a head suspension comprising a load beam having a longitudinal length with opposite proximal support and distal load regions and a spring region between the support and load regions. The support region is configured for attachment to an actuator arm, as is conventional. The load region is configured for attachment of a flexure by laser welds, the flexure supporting the slider and read/write head as is conventional. A spring region is formed between the support region and load region of the beam. In this embodiment, the spring region is defined by a groove or trough having a thickness reduced from that of the load region and support region and that is formed by etching or other equivalent methods. The spring region extends laterally completely across the load beam and terminates at opposite lateral side edges of the spring region. Because of its reduced rigidity, the spring region is less resistant to sway or lateral movement of the head suspension load region.

The outriggers are formed as cantilevered extensions of the head suspension load region. The pair of outriggers project from the opposite lateral sides of the head suspension load region toward the support region to ends of the outriggers positioned on opposite sides of the spring region where the ends of the outriggers are laterally spaced from and unattached to the spring region. The outriggers, being integral extensions from the load region, have the same thickness as the load region. Spars, having a reduced thickness from that of the outriggers, extend from the ends of the outriggers and connect the outrigger ends to the head suspension support region. The outriggers, their spars, and the opposite lateral side edges of the head suspension spring region surround apertures through the head suspension positioned at the opposite lateral sides of the spring region. With this construction, the outriggers connect the head suspension load region to the head suspension support region while bypassing the head suspension spring region. In this manner, the outriggers increase the lateral stiffness and sway frequency of the head suspension without affecting the spring rate of the head suspension.

In a further embodiment, the etched spring region of the previously described embodiment is replaced by a spring aperture formed in the material of the load beam between its load region and support region. The remainder of the head suspension's construction is substantially the same with the outriggers and spars bypassing the spring region and connecting the load region to the support region of the head suspension.

In a still further embodiment, the head suspension support region has an increased lateral width. In this embodiment, the pair of outriggers extend directly from the load region to the support region without the use of spars. Also in this embodiment, the outriggers have a thickness reduced from that of the suspension load region and support region.

In each embodiment of the invention, the pair of outriggers increase the lateral stiffness and sway frequency of the head suspension constructions without appreciably affecting the spring rate of the head suspensions.

BRIEF DESCRIPTION OF THE DRAWINGS

Further objects and features of the present invention are set forth in the following detailed description of the preferred embodiments of the invention and in the drawing figures wherein.

DETAILED DESCRIPTION OF THE PREFERRED EMBODIMENTS

Figure 1:
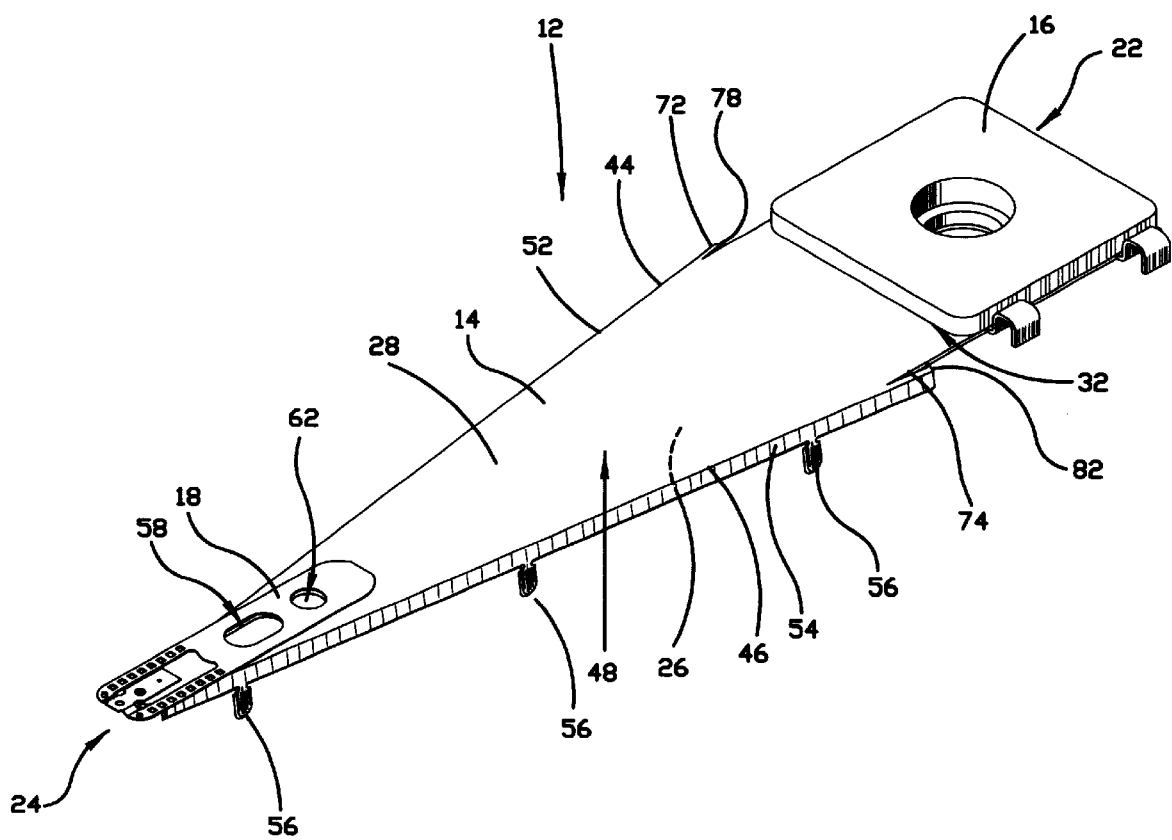
FIG. 1 is an isometric view of a first embodiment of a head suspension of the invention.

FIGS. 1–4 show a first embodiment of the head suspension 12 of the present invention. The head suspension is basically comprised of a load beam 14-, a beam support base 16, and a flexure 18. The construction of the head suspension 12 and the specific configurations of its component parts are illustrative only. The novel feature of the invention is the addition of outriggers to the head suspension as will be explained, and the description to follow should not be interpreted as limiting the use of the outriggers to a particular type of head suspension or a particular construction of a head suspension. It is believed that most any type of head suspension having a spring region between its opposite proximal and distal ends can employ the outrigger concept of the invention and thereby increase the lateral stiffness and sway frequency of the head suspension. Therefore, the component parts of the head suspension with which the outriggers are employed will be described only generally.

The load beam 14 has a longitudinal length with opposite proximal 22 and distal 24 ends and is constructed of stainless steel having a nominal sheet thickness between 0.051 and 0.076 mm. However, the beam could also be constructed of other conventionally used materials. The beam has a top surface 26 and a bottom surface 28. A portion of the load beam adjacent its proximal end 22 is formed with a support region 32 that has a lateral width approximately equal to the width of the actuator arm to which the head suspension is to be attached. An aperture 34 is formed in the support region 32 of the beam for attachment of the beam support base 16 and attachment of the head suspension to the actuator arm (not shown), as is conventional.

Figure 3:
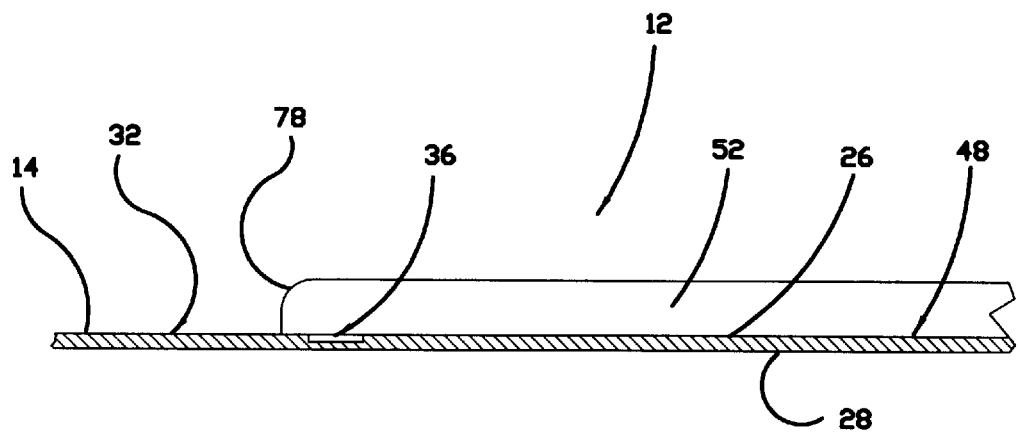
FIG. 3 is a partial side cross-sectional view of the head suspension of FIG. 1 in a plane extending along the line 3—3 of FIG. 2.
Figure 4:
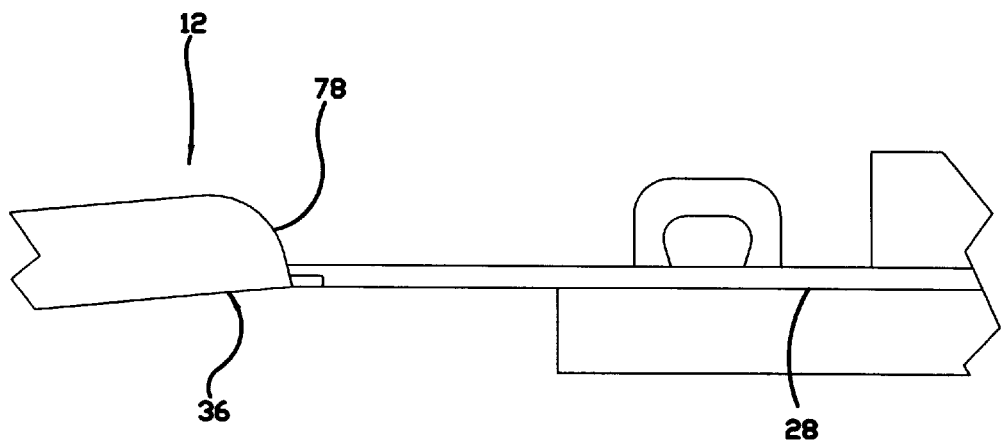
FIG. 4 is a partial side view of the head suspension of FIG. 1.

A spring region 36 is formed in the top surface 26 of the load beam adjacent the support region 32. The spring region 36 is defined by a groove or trough formed in the load beam top surface 26 by partial etching or other known methods. The groove or trough that defines the spring region 36 extends laterally completely across the load beam top surface 26 and terminates at opposite lateral edges 38, 42 of the spring region. The groove is photolithographically etched into the load beam top surface leaving a remaining thickness of about 0.038 mm of the load beam in the spring region. Beginning at the edge of the spring region closest to the beam proximal end, the beam is bent or rolled giving the beam a downward slant as it extends to its distal end from the spring region. The slant is shown in FIG. 4 where the beam is not subjected to the upward load of the air bearing. FIG. 3 shows the beam when subjected to the air bearing load which exerts a force against the beam, straightening its downward slant and creating the downward bias of the spring region.

From adjacent the spring region 36 the opposite lateral edges 44, 46 of the load beam taper toward each other as they extend longitudinally to the load beam distal end 24, defining the rigid load region 48 of the load beam. Depending on the thickness of the sheet material employed in constructing the load beam, it may be desirable to form bent flanges 52, 54 along these opposite lateral edges of the load region to increase the stiffness of this region of a load beam. One or both of these stiffening flanges may also be formed with wire guides 56 if so desired. An alignment aperture 58 and a tooling aperture 62 may be provided adjacent the load beam distal end 24 if necessary for the particular application of the head suspension.

Figure 10:
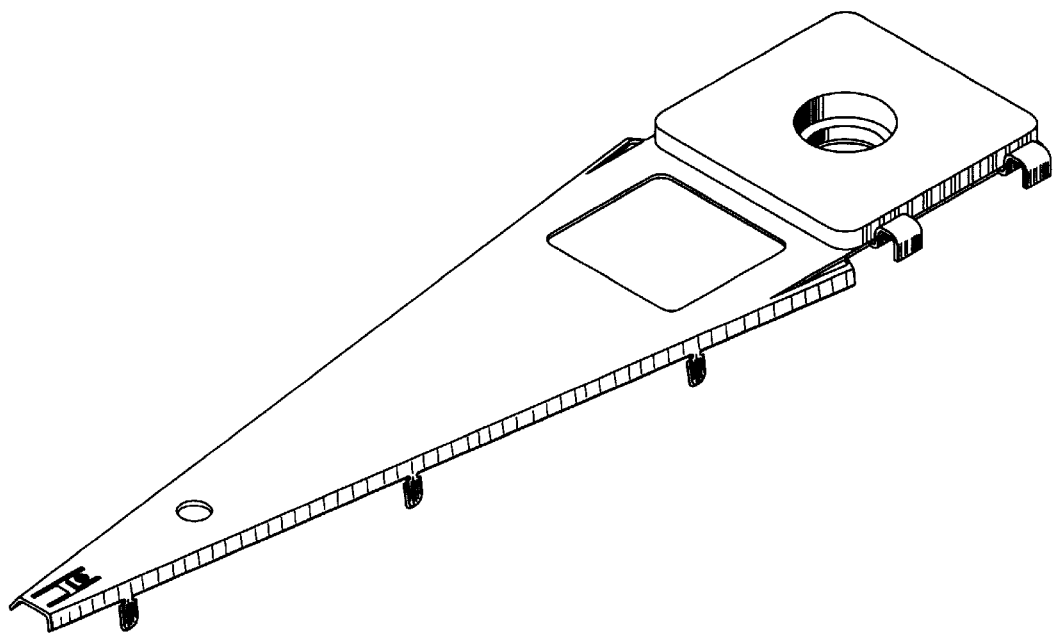
FIG. 10 is an isometric view of the head suspension of FIG. 5 with the flexure removed and a gimbal in its place.

The flexure 18 is secured to the load beam bottom surface 28 adjacent its distal end 24 by laser welds or other equivalent methods. The flexure supports the slider and transducer head (not shown) as is known in the art. The particular configuration of the flexure 18 shown in the drawing figures is illustrative only. Alternatively, depending on the application of the suspension, the distal end of the load beam could be formed with a gimbal for supporting the slider and transducer head as is shown in FIG. 10.

The construction of the beam support base 16 is for the most part conventional. The support base has a peripheral edge that corresponds to the opposite lateral side edges and the proximal edge of the load beam at the beam support region 32. A swaging boss 64 of the base extends through the support region aperture 34 and is employed in connecting the head suspension to an actuator arm as known in the art. Alternatively, other methods may be employed in attaching the head suspension to the actuator arm. The beam support base 16 itself may be secured to the beam support region 32 on the bottom surface 28 of the beam by laser welds, adhesives or other known methods.

Figure 2:
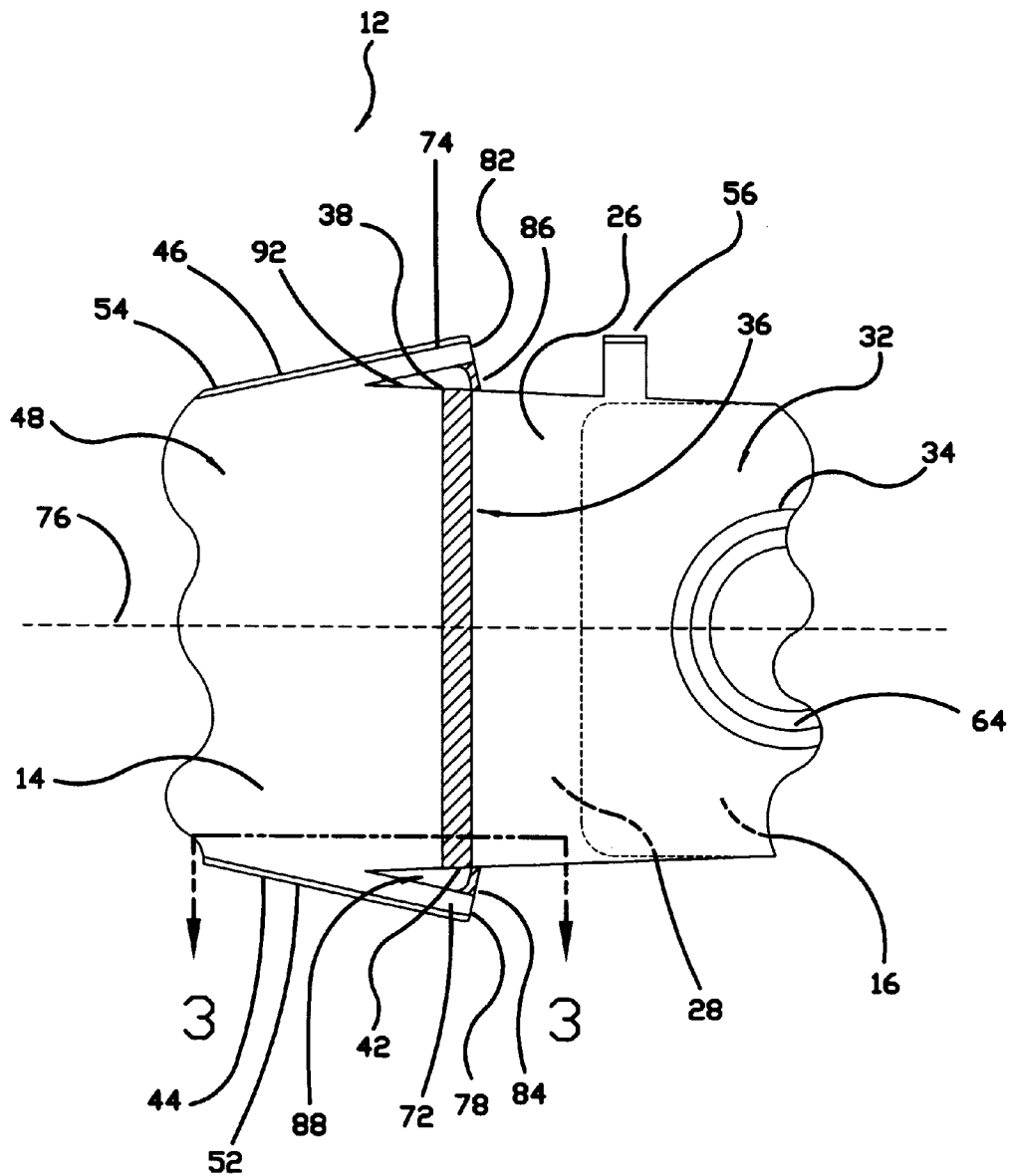
FIG. 2 is a partial plan view of the head suspension of FIG. 1.

The novel feature of the head suspension shown in FIGS. 1–4 is the provision of a pair of outriggers 72, 74 on the load beam. In the preferred embodiment of the invention, the outriggers 72, 74 are integral extensions of the rigid load region 48 of the beam. As best seen in FIG. 2, the outriggers 72, 74 project in a cantilever fashion from the beam load region 48 toward the support region 32 of the beam at acute angles relative to the longitudinal center axis 76 of the beam. The outriggers are positioned laterally outside the opposite lateral edges 38, 42 of the beam spring region 36 and extend to terminal ends 78, 82 of the outriggers positioned on the opposite sides of the spring region where the ends are laterally spaced from and unattached to the spring region. Being integral extensions of the load beam load region 48, the outriggers have the same thickness as the load beam load region. Additionally, if for the particular application of the load beam the bent flanges 52, 54 are necessary for sufficient rigidity of the load region, these flanges can be extended along the lengths of the outriggers to their terminal ends 78, 82 as shown in the drawings. A pair of spars 84, 86 or tethers connect the respective outrigger terminal ends 78, 82 to the beam support region 32. As best seen in FIG. 2, the pair of outriggers 72, 74, the pair of spars 84, 86 and the opposite lateral edges 38, 42 of the beam at the spring region 36 surround a pair of side apertures 88, 92 positioned at the opposite lateral edges of the spring region. The pair of spars 84, 86 have a reduced thickness that is formed by etching in the same manufacturing step in which the spring region 36 is formed. Therefore, the spars have the same material thickness of about 0.038 mm as the spring region. The spars connect the outrigger terminal ends 78, 82 along the edge of the spring region 36 that is closest to the beam proximal end 22. With this positioning of the spars, the angled orientation of the load region 48 to the support region 32 due to the bend of the spring region 36 when the head suspension is unloaded (see FIG. 4) will twist the reduced thickness of the spars 84, 86 in torsion and the spars will not appreciably influence the spring rate of the spring region 36. In the loaded state of the head suspension shown in FIG. 3, the spars 84, 86 are positioned in substantially the same plane as the beam support region 32 and do not appreciably affect the spring rate.

The spring region 36 of the head suspension has the least amount of material and is specifically designed to be less rigid than the support region 32 and load region 48 of the load beam, and therefore is the least capable area of the head suspension to resist sway caused by lateral forces exerted on the head suspension. By providing a connection between the support region 32 and load region 48 that passes over the spring region 36, the outriggers 78, 82 and their associated spars 84, 86 increase the sway frequency of the head suspension without appreciably increasing the head suspension's weight or appreciably affecting the spring rate of the head suspension. In testing of the embodiment of FIGS. 1–4, a peak sway frequency of 15.82 kHz was reached. The spars 84, 86 of the head suspension outriggers were then cut to determine the influence of the outriggers and spars on the sway frequency and in testing only a peak sway frequency of 12.2 kHz was reached with the spars being cut, showing that the outriggers and spars contribute significantly to increasing the sway frequency of a head suspension.

Figure 5:
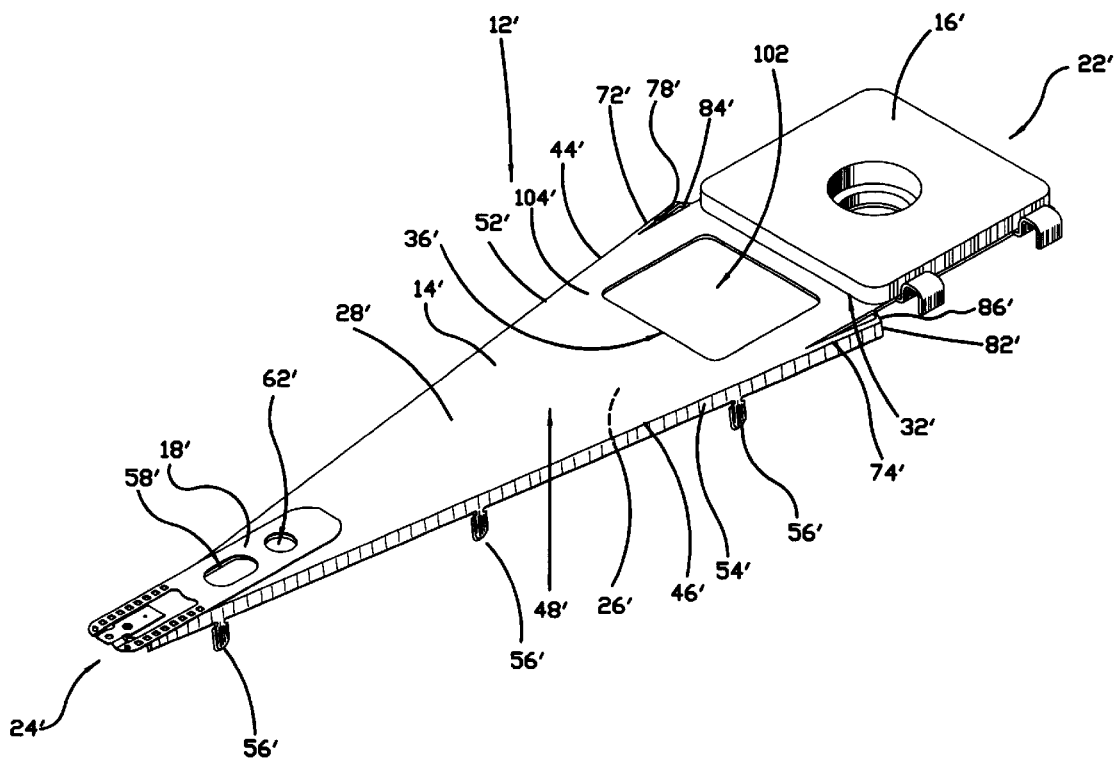
FIG. 5 is an isometric view of a further embodiment of the head suspension of the invention.
Figure 6:
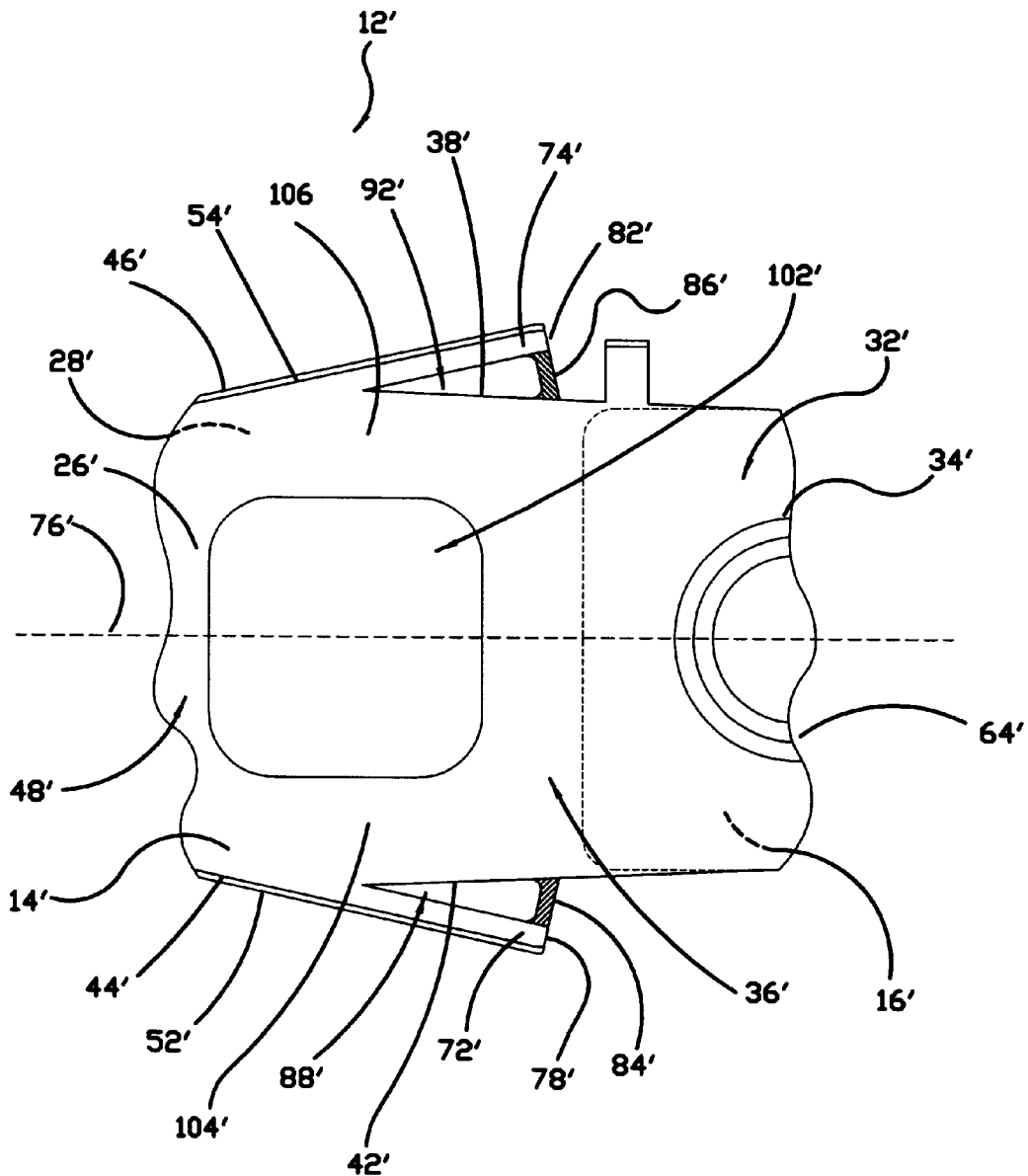
FIG. 6 is a partial plan view of the head suspension of FIG. 5.

FIGS. 5 and 6 show a variant embodiment of the head suspension shown in FIGS. 1–4, differing from that embodiment only in the manner in which the spring region of the head suspension is constructed. Therefore, the component parts of a head suspension shown in FIGS. 5 and 6 that are the same as those in the FIGS. 1–4 embodiment are labeled with the same reference numbers followed by a prime (').

In the embodiment of the head suspension shown in FIGS. 5 and 6, the spring region of the head suspension is formed by a spring aperture 102 that passes through the load beam 14' between the beam support region 32' and the beam load region 48'. The aperture 102 leaves a pair of leaf springs 104, 106 on opposite lateral sides of the aperture connecting the support region 32' with the load region 48' of the load beam. The leaf springs 104, 106 are rolled or bent downwardly giving the beam a downward slant as it extends to its distal end from the spring region. As in the previous embodiment, this construction gives the head suspension distal end its downward bias. Head suspension spring regions constructed in this manner are known in the art.

Just as in the previous embodiment, the outriggers 72', 74' of this embodiment project from the load region 48' toward the support region 32' to ends of the outriggers 78', 82' positioned on opposite sides of the spring region where the ends of the outriggers are laterally spaced from and unattached to the spring region. A pair of spars 84', 86' connect the respective outrigger ends 78', 82' to the opposite lateral side edges of the load beam at the support region 32'. The connection of the spars 84', 86' to the support region 32' is adjacent the edge of the spring aperture 102 closest to the beam proximal end 22'. With this positioning of the spars relative to the spring region, the spars are twisted in torsion when the head suspension is unloaded and do not appreciably affect the spring rate of the spring region.

Figure 7:
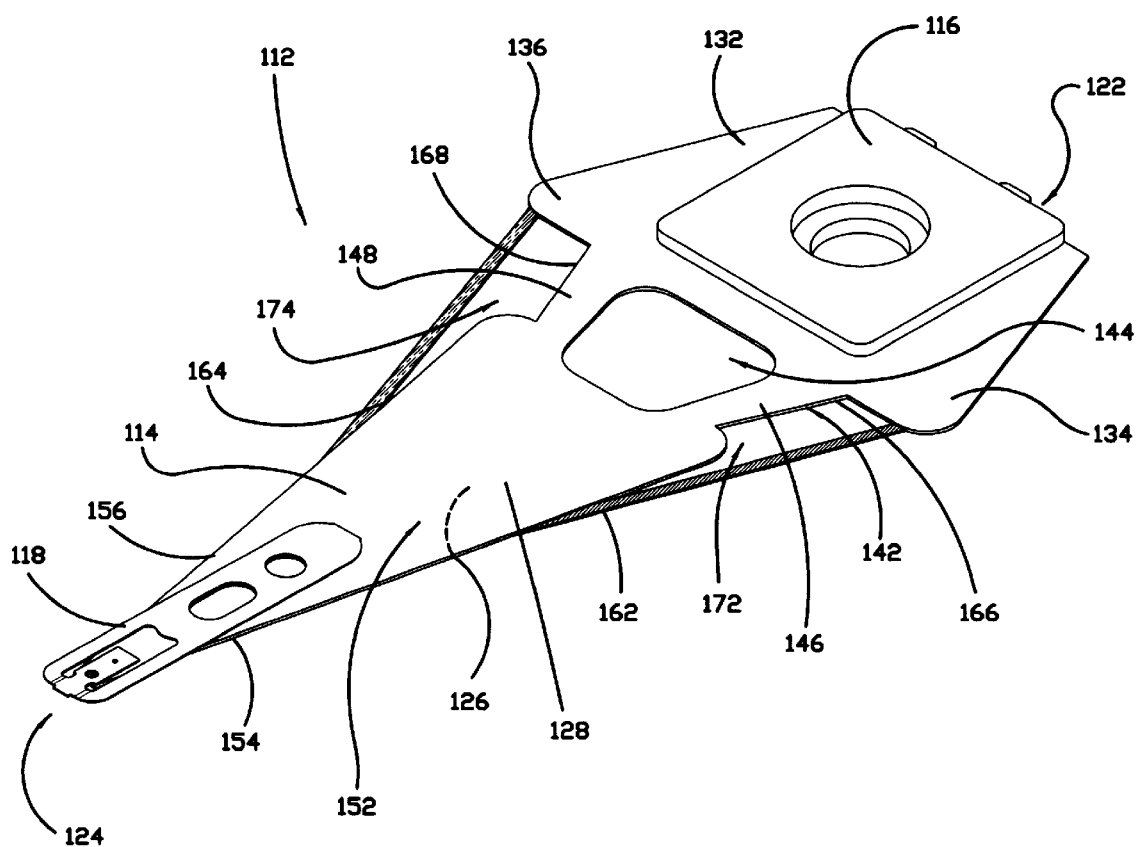
FIG. 7 is an isometric view of a still further embodiment of the head suspension of the invention.
Figure 8:
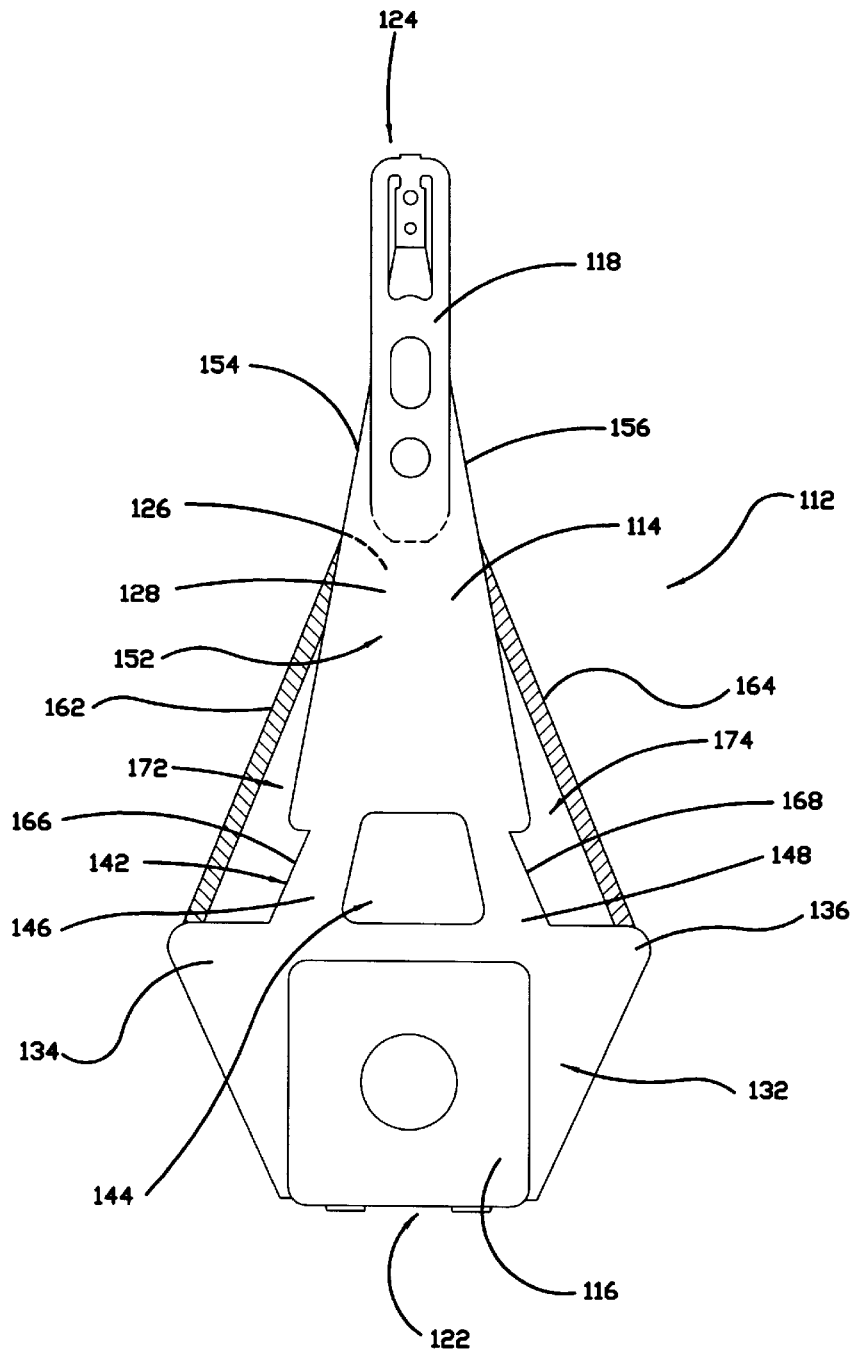
FIG. 8 is a bottom plan view of the head suspension of FIG. 7.
Figure 9:
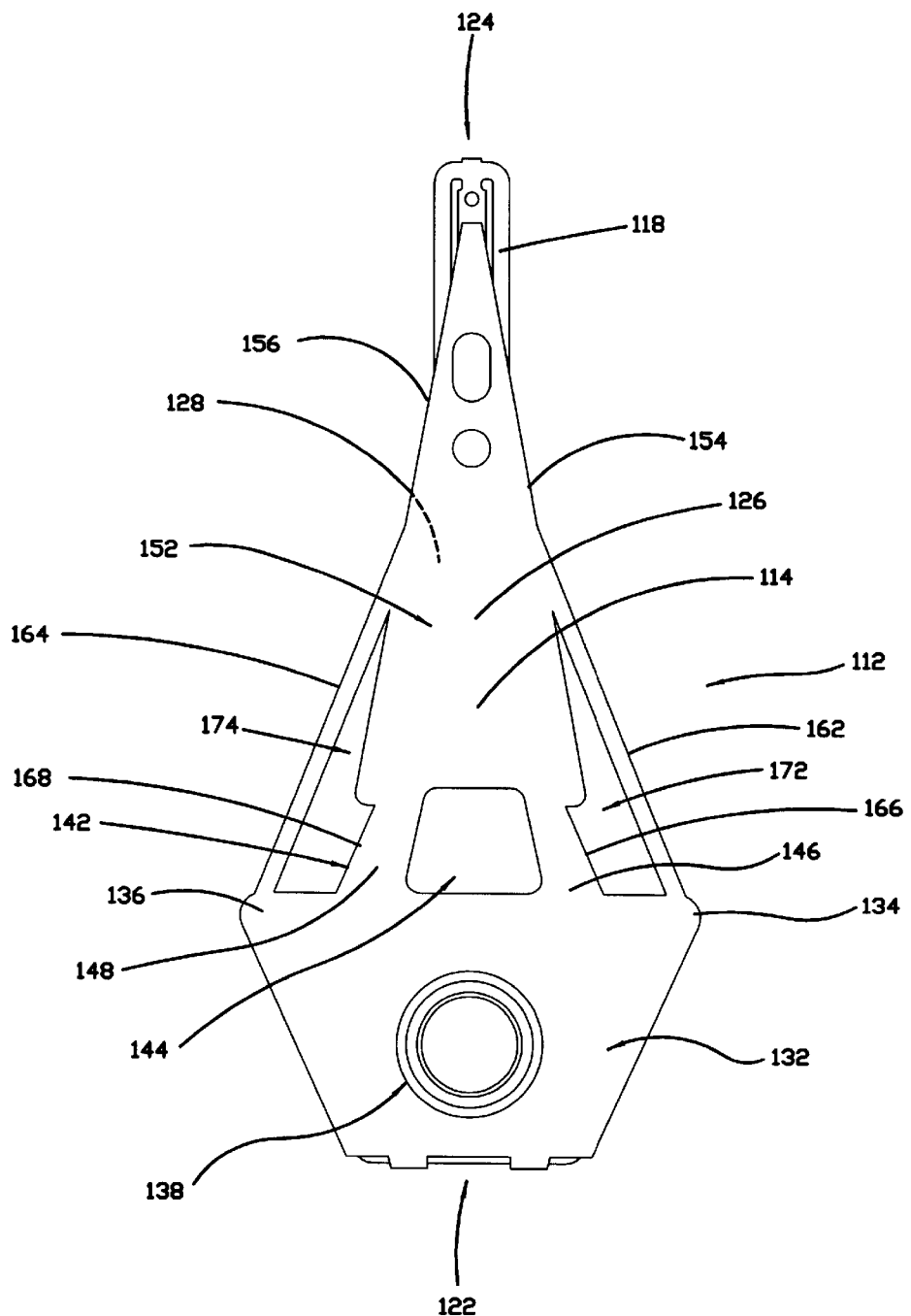
FIG. 9 is a top plan view of the head suspension of FIG. 7.

FIGS. 7–9 show a still further embodiment of the head suspension 112 of the present invention. As in the previous embodiments, this head suspension is basically comprised of a load beam 114, a beam support base 116, and a flexure 118. In this embodiment of the head suspension, its particular configuration, as well as its use of outriggers, comprise the novel features of the head suspension.

The load beam 114 has a longitudinal length with opposite proximal 122 and distal 124 ends and is constructed of a sheet of stainless steel having a nominal sheet thickness between 0.051 and 0.076 mm. The beam has a top surface 126 and an opposite bottom surface 128. A support region 132 at the beam proximal end 122 is given a unique configuration with a pair of arms 134, 136 that project laterally from the opposite sides of the beam. The arms are an extension of the support region and have the same rigidity as the support region. An aperture 138 is formed in the support region of the beam just as in the previous embodiments for attachment of the beam support base 116 and attachment of the head suspension to an actuator arm (not shown).

A spring region 142 is formed in the load beam by a spring aperture 144 in a similar manner to the previously described embodiment. The aperture 144 leaves a pair of leaf springs 146, 148 on laterally opposite sides of the aperture connecting the head suspension support region 132 with a load region 152 of the load beam. The leaf springs 146, 148 are rolled or bent downwardly at a position intermediate the longitudinal length of the spring aperture 144 giving the beam its downward slant at the load region 152 that also gives the head suspension distal end its downward bias.

From adjacent the spring region 142, the opposite lateral edges 154, 156 of the load beam taper toward each other as they extend longitudinally to the load beam distal end 124, defining the rigid load region 152 of the beam. The flexure 118 is secured to the load beam bottom surface 128 by laser welds or other equivalent methods. The flexure supports the slider and transducer head (not shown) as is known in the art. The particular configuration of the flexure 118 is illustrative only. Alternatively, depending on the application of the head suspension, the distal end of the load beam could be formed with a gimbal for supporting the slider and transducer head.

The beam support base 116 is conventional and includes a swaging boss that extends through the support region aperture 138 and is used in connecting the head suspension to an actuator arm as in known in the art. Alternatively, other methods may be employed in attaching the head suspension to the actuator arm.

In the embodiment of FIGS. 7-9, a pair of outriggers 162, 164 extend from the respective opposite lateral edges 154, 156 of the beam load region and attach it directly to the lateral arms 134, 136 of the beam support region. In a preferred embodiment, the pair of outriggers 162, 164 have a smaller thickness than the load beam 114. This reduced thickness of the outriggers is achieved by etching the outriggers or by other equivalent methods known in the art. Although having a lesser thickness, in the preferred embodiment, the outriggers 162 are integral with the load beam load region 152 and support region 132. The outriggers extend laterally outside the opposite lateral edges 166, 168 of the spring region and their connections to the support region arms 134, 136 are positioned on the opposite sides of the spring region where these ends of the outriggers are laterally spaced from and unattached to the spring region. The pair of outriggers 162, 164, the pair of support region arms, 134, 136, and the opposite lateral edges 166, 168 of the spring region surround a pair of side apertures 172, 174 that are positioned at the opposite lateral edges of the spring region. When the spring region 142 is rolled or bent downwardly to give it its downward bias, the outriggers 162, 164 are also correspondingly bent. However, when the head suspension of FIGS. 7–9 is loaded, the pair of outriggers are positioned in the same plane as the beam spring region 142 and load region 152 and do not appreciably effect the spring rate of a head suspension. However, by connecting the support region 132 and the load region 152 by passing over the less rigid spring region 142, the outriggers 162, 164 increase the sway frequency of the head suspension without appreciably increasing the head suspension's weight or appreciably affecting the spring rate of the head suspension.

While the present invention has been described by reference to a specific embodiment, it should be understood that modifications and variations of the invention may be constructed without departing from the scope of the invention defined in the following claims.

What is claimed is:

1. A head suspension for supporting a read/write head adjacent a rotating data storage device, the head suspension having opposite lateral side edges and a longitudinal length with opposite proximal and distal ends, a rigid support region of the head suspension adjacent the head suspension proximal end and a rigid load region of the head suspension adjacent the head suspension distal end, a resilient spring region formed in the head suspension between the support region and the load region, the head suspension comprising:

a pair of outriggers connecting the head suspension load region to the head suspension support region while bypassing the head suspension spring region, the outriggers being positioned laterally outside from, and unattached to, opposite lateral side edges of the resilient spring region such that the outriggers increase the lateral stiffness and sway frequency of the head suspension without appreciably effecting spring rate of the head suspension.

2. The head suspension of claim 1, wherein:

each of the outriggers has a spar that connects the outrigger ends to the head suspension with apertures formed between the outriggers, spars and the spring region of the head suspension.

3. The head suspension of claim 2, wherein:

the spars connect the outrigger ends to the opposite lateral side edges of the head suspension.

4. The head suspension of claim 2, wherein:

the spars connect the outrigger ends to the support region of the head suspension.

5. The head suspension of claim 2, wherein:

the outriggers each have a first thickness and the spars each have a second thickness that is less than the first thickness of the outriggers.

6. The head suspension of claim 5, wherein:

the head suspension support region, spring region, load region, outriggers and spars are formed unitarily from a single sheet of material and the spars have been etched to their second thickness.

7. The head suspension of claim 1, wherein:

the head suspension support region, load region and outriggers all have a first thickness and the spring region has a second thickness that is less than the first thickness.

8. The head suspension of claim 1, wherein:

the spring region has a spring aperture passing through the head suspension between the opposite lateral side edges of the head suspension.

9. The head suspension of claim 1, wherein:

bent flanges are formed along the opposite lateral side edges of the head suspension in the load region of the head suspension, and flanges extend along the outriggers to the outrigger ends.

10. The head suspension of claim 1, wherein:

the ends of the outriggers are connected to the support region of the head suspension with apertures between the outriggers and the spring region of the head suspension.

11. The head suspension of claim 10, wherein:

the support region and load region of the head suspension each have a first thickness and the outriggers each have a second thickness that is less than the first thickness.

12. The head suspension of claim 1, wherein:

the head suspension support region is positioned in a first plane and the outriggers are positioned in a second plane that is oriented at an angle relative to the first plane.

13. The head suspension of claim 12, wherein:

the load region of the head suspension is positioned in the second plane.

14. A head suspension for supporting a read/write head adjacent a rotating data storage device, the head suspension having a longitudinal length with opposite proximal and distal ends, a rigid support region of the head suspension adjacent the head suspension proximal end, a rigid load region of the head suspension adjacent the head suspension distal end, a resilient spring region in the head suspension positioned longitudinally between the head suspension support region and the head suspension load region, the spring region having laterally opposite side edges that extend between the support region and the load region, the head suspension comprising:

a pair of outriggers connecting the head suspension load region to the head suspension support region while bypassing the head suspension spring region, the outriggers being positioned laterally outside from opposite lateral side edges of the resilient spring region and unattached to the spring region, such that the outriggers resist sway caused by lateral forces exerted on the head suspension without appreciably effecting spring rate of the head suspension.

15. The head suspension of claim 14, wherein:

the load region has a first thickness and each outrigger has at least a section thereof having a second thickness that is less than the first thickness.

16. The head suspension of claim 14, wherein:

the support region has a first thickness and each outrigger has at least a section thereof having a second thickness that is less than the first thickness.

17. The head suspension of claim 14, wherein:

a pair of side apertures are formed in the head suspension on laterally opposite sides of the spring region and each aperture is partially bounded by one of the laterally opposite side edges of the spring region.

18. The head suspension of claim 14, wherein:

a pair of side apertures are formed in the head suspension on laterally opposite sides of the spring region and each aperture is partially bounded by one of the pair of outriggers.

19. The head suspension of claim 18, wherein:

the spring region is defined by a lateral groove in the head suspension separating the support region from the load region and the groove has laterally opposite ends that terminate at the pair of side apertures.

20. The head suspension of claim 18, wherein:

the spring region is defined by a spring aperture in the head suspension and a pair of leafs on laterally opposite sides of the spring aperture that extend longitudinally and connect the support region with the load region, and the pair of side apertures are positioned on laterally opposite sides of the spring aperture and pair of leafs.

21. The head suspension of claim 14, wherein:

the support region and the load region each have a first thickness and the pair of outriggers each have a second thickness that is less than the first thickness.

22. The head suspension of claim 14, wherein:

each outrigger has a rigid section and a flexible section, the rigid section projects from the head suspension load region toward the head suspension support region to an end of the rigid section positioned adjacent but laterally spaced from one of the side edges of the spring region, and the flexible section connects the end of the rigid section to the head suspension.

23. The head suspension of claim 22, wherein:

the flexible section connects the end of the rigid section to the head suspension support region.

24. The head suspension of claim 22, wherein:

a bent flange extends along each of the outrigger rigid sections.

25. The head suspension of claim 22, wherein:

the rigid sections of the outriggers have a first thickness and the flexible sections of the outriggers have a second thickness that is less than the first thickness.

* * * * *